No. 811,683. PATENTED FEB. 6, 1906.
F. YEOMAN.
DREDGE.
APPLICATION FILED AUG. 17, 1905.

5 SHEETS—SHEET 1.

Witnesses
Thos. W. Bailey.
C. H. Griesbauer.

Inventor
Frank Yeoman
by H. R. Willson
Attorney

No. 811,683.

PATENTED FEB. 6, 1906.

F. YEOMAN.
DREDGE.
APPLICATION FILED AUG. 17, 1905.

5 SHEETS—SHEET 3.

Witnesses

Inventor
Frank Yeoman,
by H. R. Wilson
Attorney

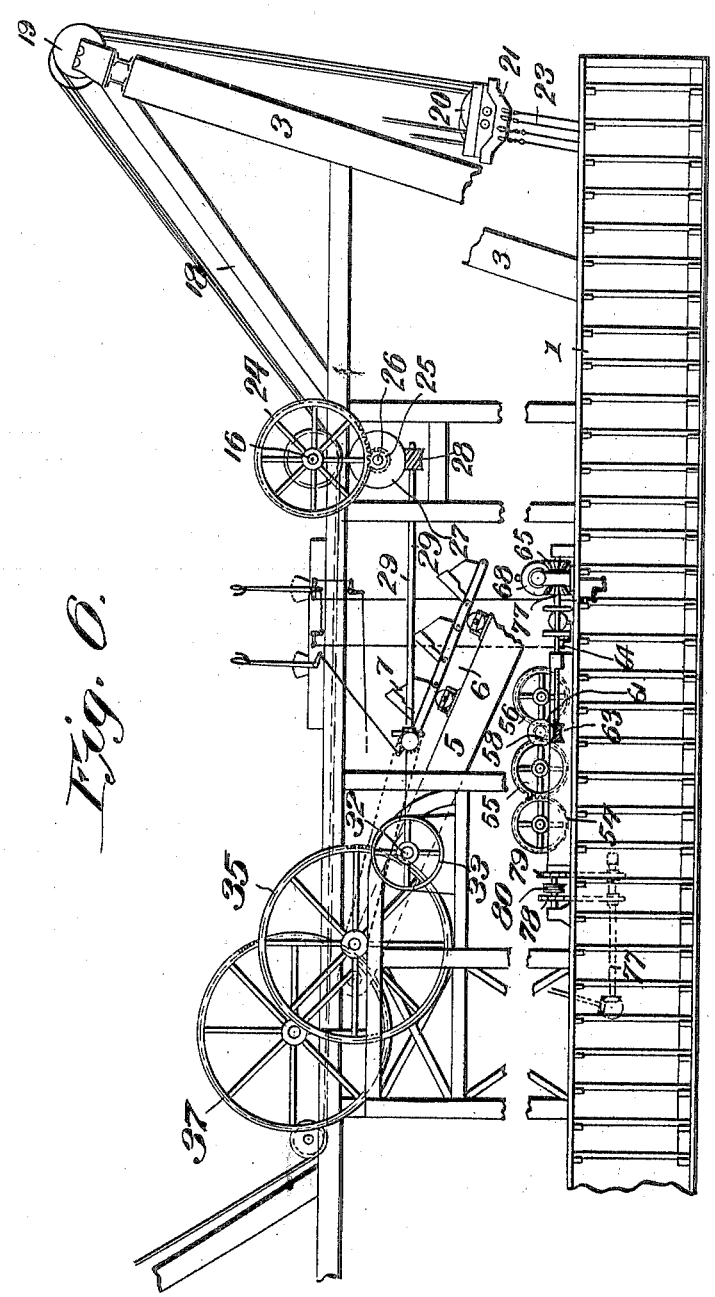

No. 811,683. PATENTED FEB. 6, 1906.
F. YEOMAN.
DREDGE.
APPLICATION FILED AUG. 17, 1905.
5 SHEETS—SHEET 5.
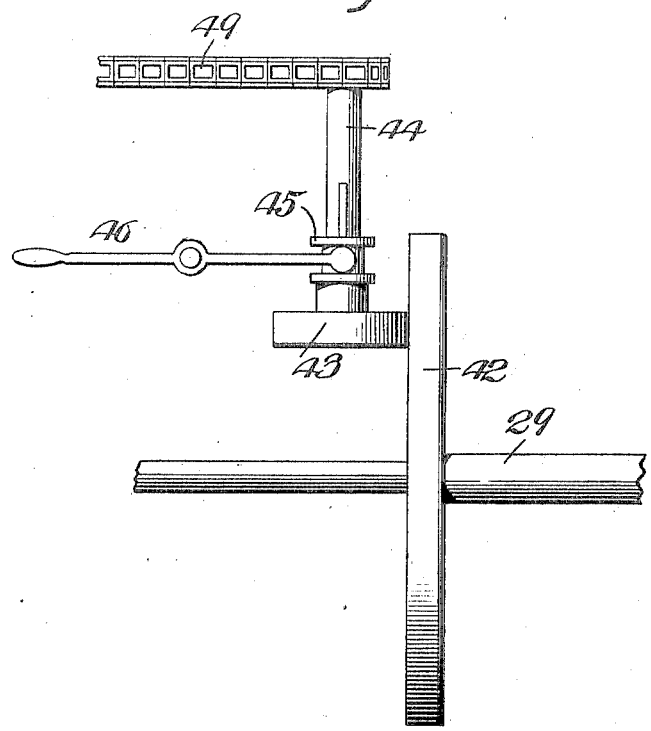
Witnesses
Geo. Hilton
C. H. Griesbauer
Inventor
Frank Yeoman,
by H. B. Wilson
Attorney

UNITED STATES PATENT OFFICE.

FRANK YEOMAN, OF OROVILLE, CALIFORNIA.

DREDGE.

No. 811,683.  Specification of Letters Patent.  Patented Feb. 6, 1906.

Application filed August 17, 1905. Serial No. 274,579.

*To all whom it may concern:*

Be it known that I, FRANK YEOMAN, a citizen of the United States, residing at Oroville, in the county of Butte and State of California, have invented certain new and useful Improvements in Dredges; and I do declare the following to be a full, clear, and exact description of the invention, such as will enable others skilled in the art to which it appertains to make and use the same.

My invention relates to improvements in dredges; and it consists in the novel construction, combination, and arrangement of devices hereinafter described and claimed.

One object of the invention is to provide a simple and efficient means for counterbalancing the swinging ladder and its endless chain of excavating-buckets, whereby the same may be raised and lowered rapidly with the minimum consumption of power.

Another object of the invention is to provide an automatic feeding means for the excavating-buckets to cause them to advance vertically into the ground at a rate just sufficient to keep them full.

Another object of the invention is to provide means for moving the dredge laterally to cause the excavating-buckets to feed sidewise or angularly, according to the nature of the ground being excavated.

A further object of the invention is to improve and simplify the construction and operation of machines of this character, and thereby render the same more efficient and durable in use.

The above and other objects, which will appear as the nature of my invention is better understood, are accomplished by means of the construction illustrated in the accompanying drawings, in which—

Figure 1:
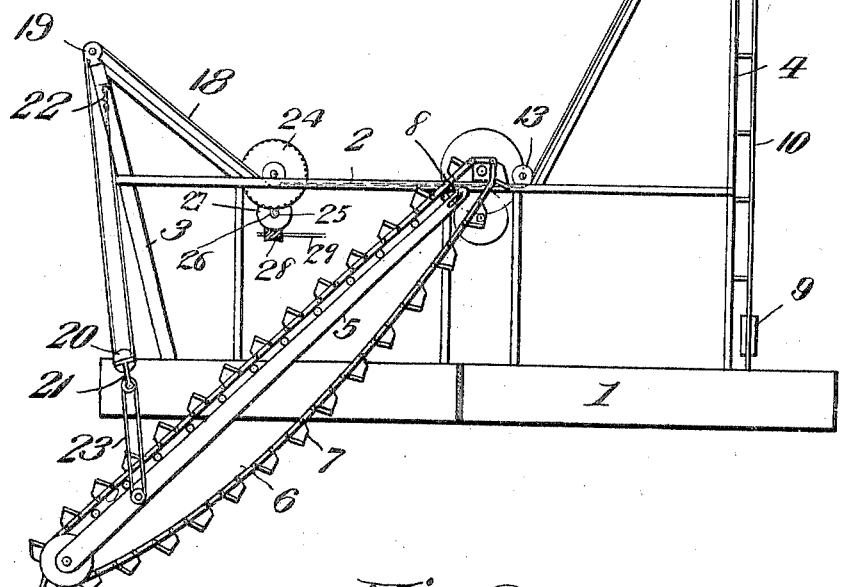
Figure 2:
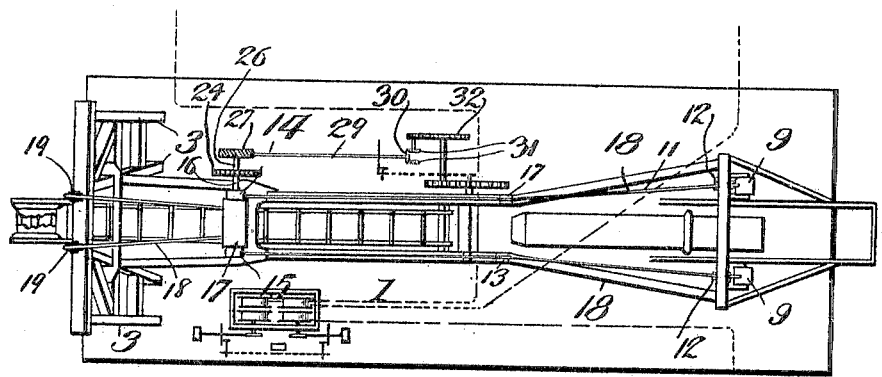
Figure 3:
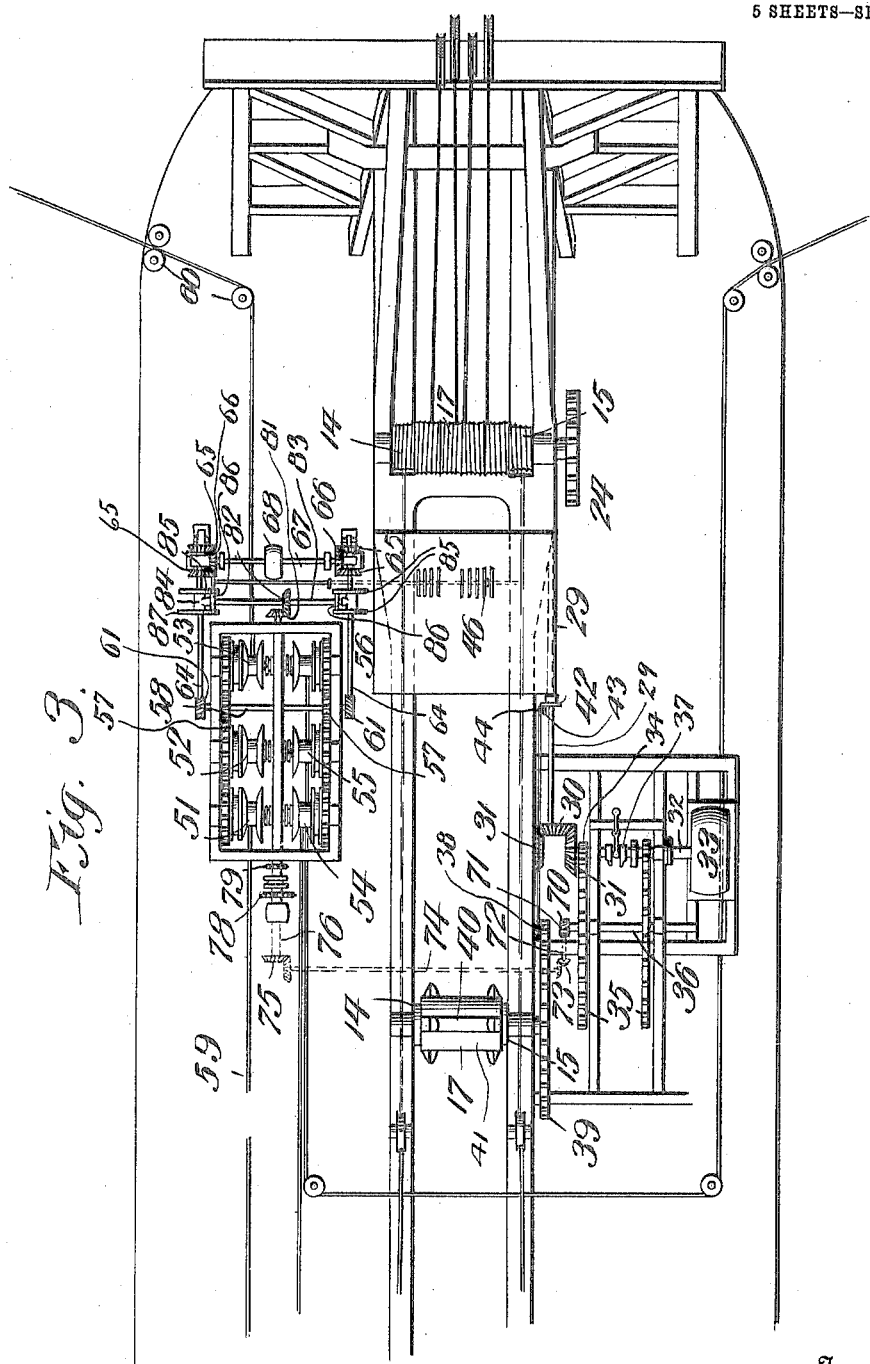
Figure 4:
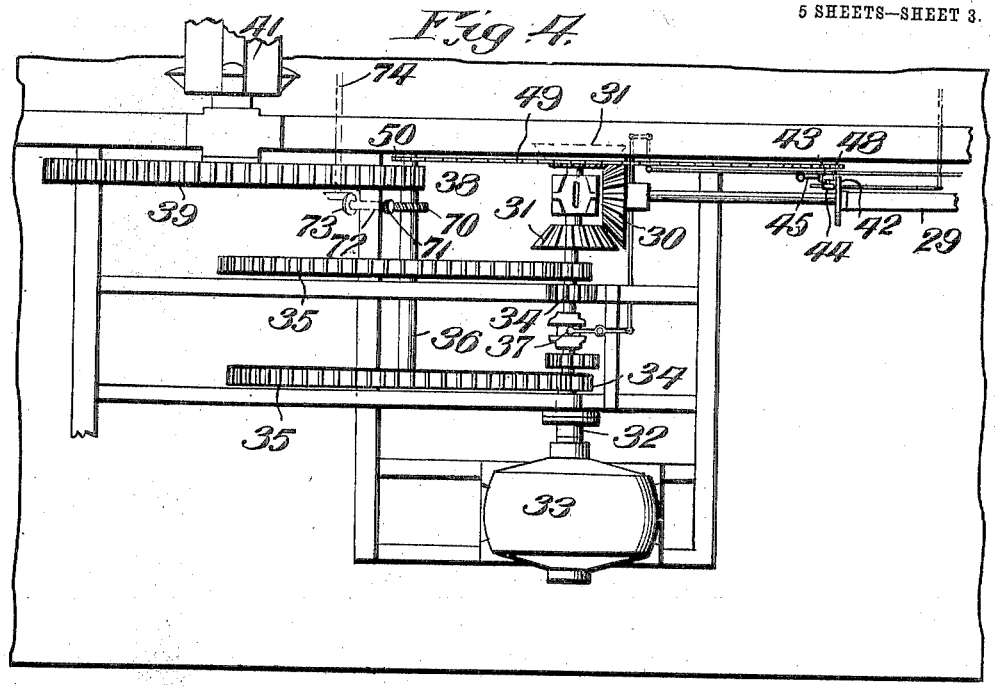
Figure 5:
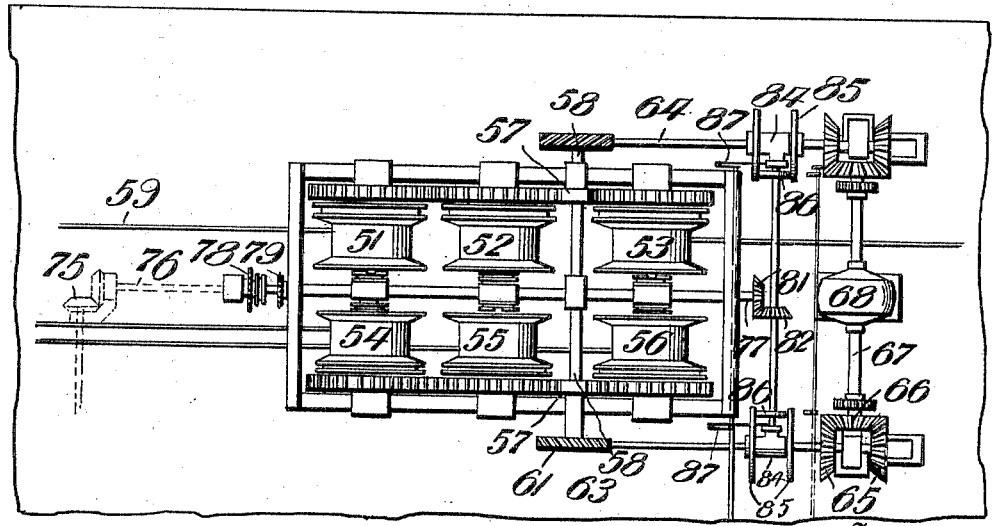

Figure 1 is a vertical sectional view through a dredge, showing its swinging ladder and chain of excavating-buckets counterbalanced in accordance with my invention. Fig. 2 is a top plan view of Fig. 1, the automatic vertical and horizontal bucket-feeding mechanisms being indicated diagrammatically. Fig. 3 is a detail top plan view, on an enlarged scale, of a portion of the dredge, showing the general arrangement of the bucket-feeding mechanisms. Fig. 4 is a detail plan view, on an enlarged scale, showing the vertical bucket-feeding mechanism. Fig. 5 is a similar view of the horizontal or side bucket-feeding mechanism, and Fig. 6 is a detail side elevation of the parts shown in Fig. 3 and also of the mounting of the swinging ladder and its chain of excavating-buckets. Fig. 7 is a detail view.

Referring to the drawings by numeral, 1 denotes the body or float of a dredge, and 2 denotes a superstructure mounted upon the same and having at one of its ends a bow-gauntree 3 and at its opposite end a stern-gauntree 4. Mounted approximately in the center of the superstructure 2 is a swinging ladder or frame 5, which supports the endless chain 6 of excavating-buckets 7 of the machine. This swinging frame or ladder 5 is pivotally mounted at its upper end, as at 8, so that its lower free portion swings through an opening formed in the forward end of the body or float 1. In order to permit the frame 5 and the bucket-chain 6 to be readily raised and lowered, I counterbalance the same by weights 9, which are slidably mounted in vertical guides 10, provided upon the stern-gauntree 4. Said weights are attached to cables or the like 11, which are passed over guide-pulleys 12 and 13, mounted, respectively, in the top of the gauntree 4 and upon the superstructure 2, as shown in Fig. 1 of the drawings, and have their ends wound upon drums 14 15, which are provided adjacent to the ends of a shaft 16. The latter is suitably journaled in bearings provided upon the superstructure 2 and has secured to it intermediate the drums 14 15 a four-section drum 17. Upon the sections of the drum 17 are wound in a direction opposite to that of the cables 11 cables 18, which pass upwardly over guide-pulleys 19, mounted upon the top of the forward gauntree 3, then downwardly around pulleys or sheaves 20, mounted in a movable sheave-block 21, and then upwardly and have their ends secured by a tension device or devices 22, here shown in the form of a turnbuckle, to the upper portion of the gauntree 3, as clearly shown in Fig. 1 of the drawings. The movable sheave-block 21 is loosely connected, as shown at 23, to the lower free portion of the swinging ladder or frame 5, so that, as will be readily seen, the ladder will be counterbalanced by the weights 9, since the cables 18 are wound upon and the cables 11 unwound from said drums, or vice versa, when the shaft 16 is rotated, thereby causing the weights 9 to be elevated as the chain of buckets descends and lowered when said chain of buckets is swung upwardly. By thus counterbalancing the swinging frame 5 and its chain of buckets the same may be raised and lowered with the minimum consumption of power.

In order to rotate the shaft 16 of the drums 14 15 17 so as to permit the frame 5 to be swung vertically, I provide upon one end of said shaft a gear 24, which meshes with a pinion 25 upon a counter-shaft 26. Upon said shaft 26 is a worm-wheel 27, which is driven by a worm 28, secured upon one end of a longitudinally-extending shaft 29. The latter has upon its opposite end a beveled wheel 30, which is disposed between and adapted to be driven by either one of two similar beveled wheels 31, which are slidably mounted upon a power-shaft 32 and controlled by a suitable clutch. (Not illustrated.) It will be seen that when the wheels 31 are shifted so that one of them engages the wheel 30 the motion of the power-shaft will be imparted to the shaft 29 and through the intermediate gearing to the shaft 16 to cause it to be rotated in either direction.

The power-shaft 32 may be driven in any desired manner; but, as illustrated in the drawings, I have shown mounted thereon an electric motor 33, which also supplies the power for driving the endless chain of excavating-buckets. This latter result is effected by providing upon the shaft 32 pinions 34, which mesh with gears 35, secured upon a counter-shaft 36. The gears 35 are of different sizes, and the pinions 34 are loose upon the shaft 32 and are adapted to be locked thereto by a sliding clutch 37, as clearly shown in Fig. 3 of the drawings. By means of this construction it will be seen that the counter-shaft 36 may be driven from the shafts 32 at two different speeds. Upon the shaft 36 is secured a pinion 38, which meshes with a gear 39 upon a shaft 40, carrying a sprocket-wheel or tumbler 41, about which the bucket-chain 6 passes and by means of which the latter is driven.

In order to cause the excavating-buckets to advance into the earth that is being excavated at a rate just sufficient to keep them full, I provide an automatic vertical feed mechanism for the swinging frame 5 and its endless chain of excavating-buckets. This feeding means is in the form of a variable-speed friction-drive mechanism mounted between the shaft 29 and the counter-shaft 36, as clearly shown in Figs. 3 and 4 of the drawings. Upon the shaft 29 at a suitable point is secured a friction-disk 42, which is driven by a small friction-wheel 43, mounted upon a short shaft 44, which is disposed radially with respect to the shaft 29. Said wheel 43 is keyed to rotate with the shaft 44, but is mounted to slide thereon, so that it may be moved readily toward and from the center of the disk 42, which it drives by the frictional contact of its periphery with one face of said disk. A suitable clutch 45 is provided for shifting the wheel 43, and said clutch may be operated by a lever 46, mounted upon a platform 47 and operatively connected, as shown, to said clutch 45 or in any other desired manner. Upon the shaft 44 is secured a sprocket-wheel 48, which is connected by a sprocket-chain 49 to a sprocket-wheel 50, secured upon the counter-shaft 36. It will be seen that owing to the provision of this variable-speed gearing between the shafts 36 and 29 the shaft 16 may be rotated at a very slow rate of speed, which may be readily controlled, so that the frame 5 and its chain of excavating-buckets may be lowered to cause the latter to advance into the earth at a rate just sufficient to keep the buckets full, and thereby cause the machine to operate in a most efficient manner.

In order to provide an automatic side feed for the endless excavator, so that the buckets may cut sidewise or angularly when the side feed is used in connection with the vertical feed just described, I provide suitable driving connections between the counter-shaft 36 and the gearing of the usual side line winch. The latter, as clearly shown in Figs. 3 and 5 of the drawings, is of the usual form and consists of six drums 51 52 53 54 55 56, which are mounted in pairs upon three parallel shafts. The drums 51 and 52 and drums 54 and 55 are geared together, as shown, and the gears of the drums 52 and 53 and of the drums 55 and 56 are in mesh with pinions 57, secured upon a shaft 58. Wound upon the drums 51 54 53 56 are cables or the like 59, which extend, as clearly shown in Figs. 2 and 3 of the drawings, around guide pulleys or sheaves 60, mounted adjacent to the ends of the float or body 1, so that one of said cables 59 extends from each of the four corners of the float and is adapted to be secured to some stationary object. Upon the ends of the shafts 58 are worm-wheels 61, which engage worm-wheels 63 upon shafts 64. The latter have loosely mounted thereon adjacent to their outer ends pairs of beveled wheels 65, which may be moved into engagement with beveled wheels 66, provided upon a power-shaft 67, which, as shown in the drawings, may be driven by an electric motor 68, secured thereon. The wheels 65 are keyed to rotate with the shafts 64, but are free to slide thereon, so that either one of them may be moved into engagement with one of the wheels 66 by a suitable clutch mechanism, as shown. By means of the gearing just described it will be seen that any one of the drums may be rotated in either direction to pay in or out the cable 59, so that the float or body 1 may be moved or swung to any desired position; but in order to move or swing the body 1 laterally, so that the buckets will be swung to cause them to cut the earth sidewise I provide a variable-speed friction-drive mechanism between the shafts 64 and the shaft 36. This mechanism comprises a worm-wheel 70, secured upon the shaft 36 and engaging a worm 71 upon a shaft 72. The latter is connected by a pair of beveled gears 73 to one end of a shaft 74, which extends transversely, as shown in Fig. 3, and has its other end connected by a pair of beveled gears 75 to one end of a shaft 76. The latter is geared to a shaft 77 by means of two sprocket-wheel and chain-driving connections 78 and 79, as shown in Figs. 3 and 6 of the drawings, so that the shaft 77 may be driven from the shaft 76 at two different speeds. Each of the connections 78 79 consists of a pair of sprocket-wheels connected by a sprocket-chain, the sprocket-wheels upon the shaft 77 being loosely mounted, so that either one may be fixedly connected thereto by a suitably-operated clutch 80. The shaft 77 extends between the drums of the side line winch and has at its other end a beveled gear 81, which meshes with a similar gear 82, secured upon a transversely-extending shaft 83. The shaft 83 has its end journaled in bearings 84, which are slidable upon the shafts 64 between friction-disks 85, which are arranged in pairs and secured to the shaft 64, as shown. Secured upon the shaft 43 between the disks 85 are friction-wheels 86, which may be moved into contact with the disk of either pair by shifting the bearings 84 by means of suitable levers and connecting-links 87, as shown. When the wheels 86 are shifted into and out of frictional contact with the disks 85, it will be seen that the motion imparted to the shafts 64 from the shaft 83 will be reversed. The driving connections just described between the shafts 64 and the shaft 36 will operate the drums of the side line winch very slowly, thereby causing the excavating-buckets to feed sidewise at a very slow rate. When it is desired to adjust the float or the dredge rapidly, the said drums are driven by the motor 68. When this side feed is used in connection with the vertical feed, it will be seen that the buckets may be caused to move in an angular direction.

The construction, operation, and advantages of the invention will be readily understood from the foregoing description, taken in connection with the accompanying drawings, and it is thought a further description is unnecessary.

While I have shown and described the preferred embodiment of my invention, I do not wish to be limited to the precise construction herein set forth, since various changes in the form, proportion, and the minor details of construction may be resorted to without departing from the principle or sacrificing any of the advantages of this invention.

Having thus described my invention, what I claim as new, and desire to secure by Letters Patent, is—

1. In a dredge, the combination with a swinging frame carrying an endless excavator, of a counterbalancing-weight, a drum, flexible connections between said weight, said frame and said drum, and a variable-speed driving means for said drum.

2. In a dredge, the combination with a swinging frame carrying a chain of excavating-buckets, of vertical guides, counterbalanced weights slidable in said guides, a winding-drum, cables attached to the free end of said frame and wound upon said drum, and cables attached to said weights and wound upon said drum in a direction opposite to that of the first-mentioned cables, substantially as described.

3. In a dredge, the combination with a swinging frame carrying an endless excavator, of a counterbalancing-weight, a drum, flexible connections between said weight, said frame and said drum, a power-shaft, driving connections between the latter and said drum, and variable-speed friction-drive gearing between said power-shaft and said driving connections, substantially as described.

4. In a dredge, the combination with a swinging frame carrying an endless excavator, of a counterbalancing-weight, a drum, flexible connections between said weight, said frame and said drum, a power-shaft, gearing between said power-shaft and the shaft of said drum, said gearing comprising a longitudinal shaft, a counter-shaft geared to said power-shaft, a friction-disk upon said longitudinal shaft, a shaft extending radially with respect to said longitudinal shaft, a friction-wheel slidable upon but free to rotate with the last-mentioned shaft and adapted to engage said friction-disk, and a driving connection between said counter-shaft and said radially-disposed shaft, substantially as described.

5. In a dredge, the combination with a swinging frame carrying an endless excavator, of a drum, a cable wound upon said drum and attached to said frame, a power-shaft, drive-gearing between said power-shaft and the shaft of said drum and comprising a longitudinal shaft, a counter-shaft geared to said power-shaft, a friction-disk upon said longitudinal shaft, a shaft disposed radially with respect to said longitudinal shaft, a friction-wheel mounted to slide upon but keyed to rotate with said radially-disposed shaft, and a driving connection between the latter and said counter-shaft, substantially as described.

6. In a dredge, the combination with a floating body carrying a vertically-swinging endless excavator, of guide devices adjacent to the corners of said body, a series of winding-drums, and a series of cables or the like engaged with said guide and each having one of its ends wound upon one of said drums and its other end adapted for attachment to a stationary object whereby said floating body may be moved laterally.

7. In a dredge, the combination with a floating body carrying a vertically-swinging endless excavator, of guide devices adjacent to the corners of said body, winding-drums, cables wound upon said drums and engaged with said guide devices, the free ends of said cables being adapted to be secured to stationary objects, a driving mechanism for said drums, a driving mechanism for said excavator, and a variable-speed driving mechanism between the driving mechanism of said excavator and the driving mechanism of said drum, substantially as described.

8. In a dredge, the combination of a float, a vertically-swinging frame mounted therein, and an endless excavator mounted upon said frame, a series of side line drums, a driving-shaft for said drums, a power-shaft, longitudinal shafts geared to said drive and power shafts, a counter-shaft, frictional gearing between the ends of said counter-shaft and said longitudinal shaft, and means for driving said counter-shaft, substantially as described.

9. In a dredge, the combination of a float, a vertically-swinging frame mounted therein, and an endless excavator mounted upon said frame, a series of side line drums, a driving-shaft for said drums, a power-shaft, longitudinal shafts geared to said driving and power shafts, a counter-shaft, frictional gearing between the ends of said counter-shaft and said longitudinal shaft, means for driving said counter-shaft, a main power-shaft, a counter-shaft geared to the latter and variable-speed driving connections between the latter-mentioned counter-shaft and the first-mentioned counter-shaft, substantially as described.

In testimony whereof I have hereunto set my hand in presence of two subscribing witnesses.

FRANK YEOMAN.

Witnesses:
 C. D. DUNN,
 JNO. W. GODFREY.